United States Patent [19]

Tanaka et al.

[11] Patent Number: 4,613,906

[45] Date of Patent: Sep. 23, 1986

[54] PICTURE COMBINING APPARATUS

[75] Inventors: Hiroaki Tanaka, Tokyo; Ryuzo Motoori, Kawasaki, both of Japan

[73] Assignee: Nippon Kogaku K.K., Tokyo, Japan

[21] Appl. No.: 548,204

[22] Filed: Nov. 2, 1983

[30] Foreign Application Priority Data

Nov. 4, 1982 [JP] Japan .............................. 57-192521

[51] Int. Cl.[4] .............................................. H04N 7/08
[52] U.S. Cl. ..................................... 358/183; 358/22; 340/721
[58] Field of Search .......................... 358/183, 22, 181; 340/721, 798, 799

[56] References Cited

U.S. PATENT DOCUMENTS 4,471,382 9/1984 Toyoda .................................. 358/22

Primary Examiner—Tommy P. Chin
Attorney, Agent, or Firm—Michael N. Meller

[57] ABSTRACT

A picture combining apparatus for concurrently using a single shooting television camera to pick up still pictures such as titles. In the picture combining apparatus, the level of a luminance signal in a still picture signal generated from the television camera is compared with a threshold level to generate a binary signal corresponding to the difference therebetween and the binary signal is stored in a memory. At a given time during the shooting of a background the content of the memory is read so that the binary signal is provided with a particular color or luminance level and is superimposed on a background picture signal from the camera. Thus, the camera generates an output signal corresponding to a picture comprising the still picture superimposed on the background.

10 Claims, 3 Drawing Figures

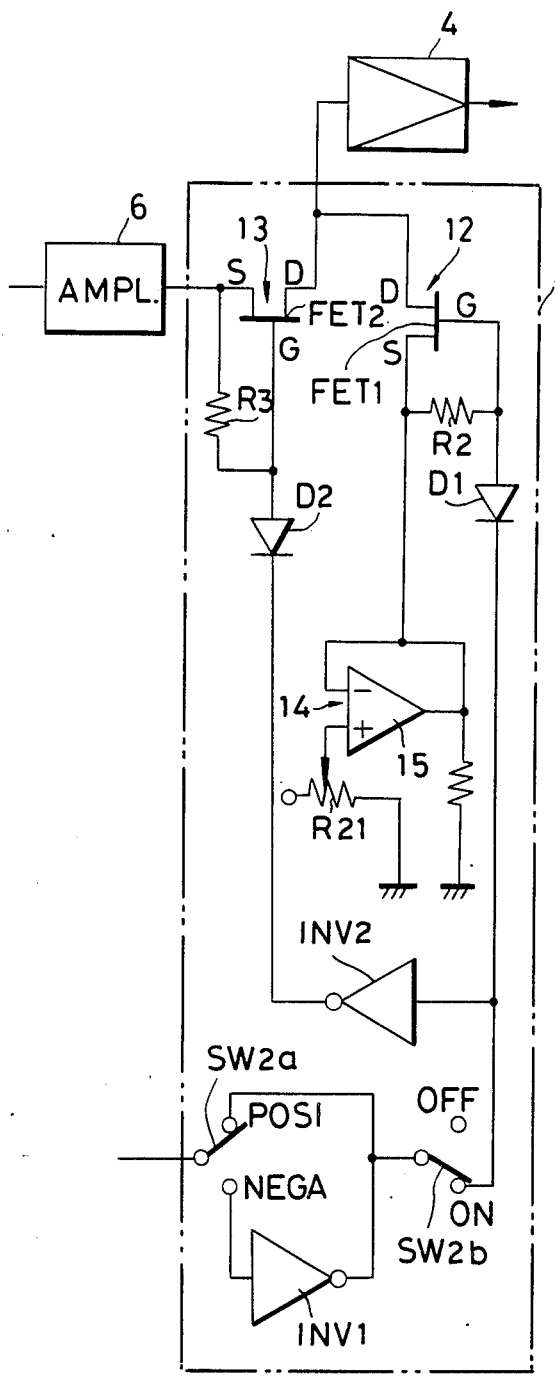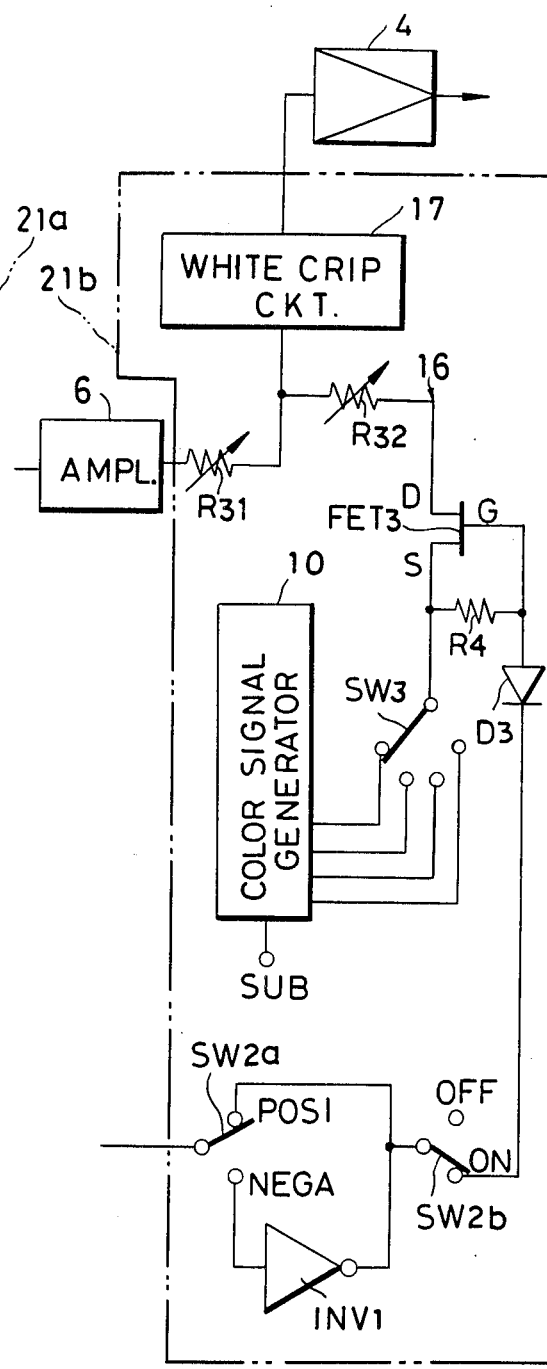

PICTURE COMBINING APPARATUS

BACKGROUND OF THE INVENTION

The present invention relates to a picture combining apparatus for inserting a signal of a separate still picture in a picture signal from a television camera.

To record a television picture signal picked up by a television camera and a signal of a still picture such as characters, numerals, symbols, patterns for displaying a title, date, photographing data or the like on a magnetic tape or the like, it is conceivable to use a title shooting black and white television camera and a combining apparatus designed so that in response to a switching operation a video output from the black and white television camera is inserted in the television picture signal or the television picture signal recorded in a video tape recorder(VTR) and played back for editing purposes. However, this attempt will involve a number of disadvantages that consideration for the portability will be given only to the indoor movement of the black and white television camera, that heavy and bulky equipment must be carried in order to simultaneously shoot a scene and insert a still picture such as a title at the outdoor site of shooting, that the two television cameras for shooting and still picture taking purposes must be operated and so on.

SUMMARY OF THE INVENTION

It is the primary object of the present invention to provide a picture combining apparatus which is excellent in portability and capable of allowing a single shooting television camera to concurrently shoot still pictures such as titles and the like.

In accordance with the invention there is thus provided a picture combining apparatus comprising luminance signal extracting means for extracting the luminance signal in a picture signal generated from the image pickup means of a television camera, comparison means for comparing the value of a luminance signal generated from the luminance signal extracting means with a threshold value to generate a signal having one of two possible levels corresponding to the magnitudes of the luminance signal value relative to the threshold value, memory means for storing the signal generated from the comparison means, picture signal generating means for generating a picture signal, and combining means for combining the picture signal output from the picture signal generating means and the picture signal output from the image pickup means, wherein preferably the respective means are incorporated within the television camera and also the electronic viewfinder of the television camera provides an image display of the output from the combining means. In the actual use, an object such as a title, characters or graphic matter to be inserted is first picked up by the television camera and binarized data of its luminance signal are stored. Then, while taking a desired picture such as a title background, the stored content is read out as occasion demands so that a still picture signal is generated and inserted in the picture signal output to generate a combined picture signal.

In accordance with an embodiment of the invention, the picture signal generating means includes color signal generating means whereby a selected one of a plurality of preliminarily prepared selectable hues is added to the output signal of one or the other of the two levels from the comparison means, thereby converting a still picture to be inserted, e.g., title characters, to a color still picture having a desired color.

Also, in accordance with another embodiment of the present invention, the picture signal combining means includes picture luminance adjusting means for subjecting one or the other of the two levels of the output signal from the comparsion means to a variable level adjustment whereby a still picture to be inserted, e.g., title characters, are provided with a desired luminance.

The picture signal generating means may be designed so that the signal from the memory means is selectively reversed in polarity to produce a positive or negative still picture to be inserted and also it is possible to make a choice as to whether a title background picture is reproduced outside or inside the contour of the inserted still picture on the reproduced picture.

The combining means is composed, for example, of switching means so designed that the picture insert is effected by selectively passing the picture signal output from the picture signal generating means and the picture signal output from the television camera, and in accordance with another form the combining means is composed, for example, of superimposing one of means adapted for superimposing the picture signal output and the video signal output on top of the other whereby the levels of the signals to be superimposed are adjusted so as to fade in or out the inserted picture.

In accordance with the invention, the memory means has the function of directly passing the output signal from the comparison means to the picture signal generating means so as to store the output signal of the comparison means as occasion demands and usually its storage capacity corresponds to one frame of television signals. Particularly, in accordance with one form the memory means is repeatedly read in two times per frame, thereby reducing its storage capacity by half to correspond to one field.

In accordance with the invention, there is no need to use any exclusive black and white televison camera for title inserting purposes as used in the past and the desired combining of pictures can be accomplished by means of a single television camera, thereby making it possible to realize a picture combining apparatus which is small in size, light in weight and portable so that it may be incorporated in a television camera or mounted or incorporated in a portable VTR or the like which is connected to the television camera.

The above and other objects as well as advantageous features of the invention will become more clear from the following description taken in conjunction with the drawings.

BRIEF DESCRIPTION OF THE DRAWINGS

FIG. 2 is a block diagram showing the principal part of another embodiment of the invention.

FIG. 3 is a block diagram showing the principal part of still another embodiment of the invention.

DESCRIPTION OF THE PREFERRED EMBODIMENTS

Figure 1:
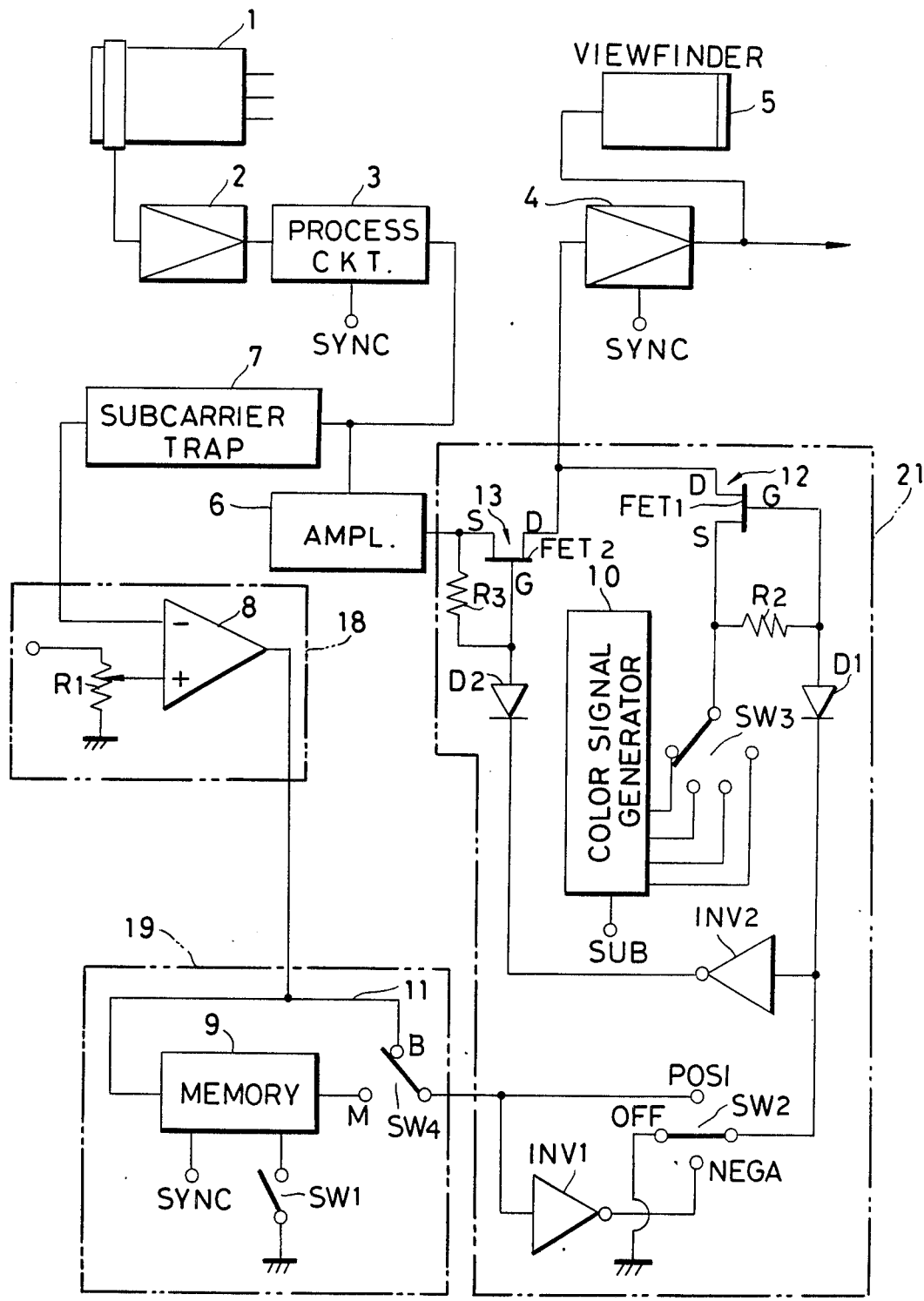
FIG. 1 is a circuit block diagram showing an embodiment of the invention.

FIG. 1 is a block diagram of an embodiment of the invention showing its circuit construction combined with the respective component elements of a television camera.

More specifically, in FIG. 1 the televison camera comprises image pickup means 1 including a solid-state imaging device for dividing an image of an object into a given number of picture elements, a process circuit 3 for receiving a pickup output through a preamplifier 2 and converting it to a given standard television signal of the NTSC system or the like (hereinafter referred to as a television picture signal), an output amplifier 4 for amplifying the television picture signal and supplying it to an external unit such as a VTR which is not shown, and a color electronic viewfinder 5 for providing a picture display of the output from the output amplifier 4 within the camera. The circuit elements of the respective means constituting the principal part of the present invention are connected to the televison camera. Numeral 6 designates a buffer amplifier.

In FIG. 1, the picture combining apparatus of this invention basically comprises a subcarrier trap 7 forming means for extracting the luminance signal from an output of the process circuit 3, comparison means 18 in which the luminance signal from the subcarrier trap 7 is compared with a reference level set by a variable resistor $R_1$ in a comparator 8 to generate a binary signal having one of two different levels, memory means 19 including a memory circuit 9 for storing the binary signal for one field generated from the comparison means 18, and combining means 21 responsive to the binary signal generated repeatedly two times for each frame from the memory means 19 to generate a still picture signal to be inserted conforming to the standard television system in accordance with a pseudo-interlaced scanning method and combine the still picture signal with the television picture signal received through the buffer amplifier 6, thereby applying the resulting combined picture signal to the output amplifier 4.

In the embodiment of FIG. 1, the memory means 19 includes the memory circuit 9, an actuating switch $SW_1$, a memory bypass circuit 11 and an output selector switch $SW_4$. The actuating switch $SW_1$ controls the write operation of the memory circuit 9, and whether the binary signal from the input is directly delivered through the bypass circuit 11 or the stored content of the memory circuit 9 is read and delivered is determined by the switching operation of the output selector switch $SW_4$.

The combining means 21 includes a first inverter $INV_1$, a picture combining switch $SW_2$ having three positions, i.e., a positive position POSI, an off position OFF and a negative position NEGA, a second inverter $INV_2$, color signal generating means 10 and a color selector switch $SW_3$. The binary signal from the memory means 19 is directly generated as a positive picture signal when the picture combining switch $SW_2$ is moved to the positive position POSI and the polarity of the binary signal is inverted by the first inverter $INV_1$ to deliver the same as a negative picture signal when the picture combining switch $SW_2$ is moved to the negative position NEGA. Of course, no picture signal for combining purposes is generated when the switch $SW_2$ is moved to the position OFF. The color selector switch $SW_3$ selects one of a plurality of hues, including white and black, for the color signal output of the color signal generating means 10 and this color signal output is added to one or the other of the two levels of the binary signal included in the picture signal. When this occurs, the inside or outside (selected by the switch $SW_2$) of a picture pattern by the picture signal appears all in the hue of the selected color signal and the still picture having the desired color is inserted.

In the embodiment of FIG. 1, the combining means 21 further includes two switching means 12 and 13 so that the switching means 12 receives the binary signal output of one of the two levels through the memory means 19 and the other switching means 13 receives the binary signal output of the other level through the second inverter $INV_2$. In this way, the still picture signal is inserted in the television picture signal from the buffer amplifier 6. Note that symbols $D_1$ and $D_2$ designate diodes, $R_2$ and $R_3$ bias resistors, $FET_1$ and $FET_2$ switching field-effect transistors, and G, S and D the gates, sources and drains of the switching transistors. It is needless to say that the process circuit 3, the output amplifier 4, the memory circuit 9 and the color signal generating circuit 10 are operated on the basis of the same synchronizing signals SYNC from a synchronizing signal generating circuit which is not shown.

The operation of the apparatus shown in FIG. 1 will now be described with reference to some examples where title characters are actually inserted in a television picture.

(a) The insertion of a title in the form of red characters on an object image forming a title background.

In this case, a character plate having a sufficient contrast between the light and darkness, e.g., comprising black characters written on a white background is prepared first and then the television camera is operated, thus performing a framing or determining a particular position of the picture for inserting the title characters while viewing the title characters on the character plate through the electronic viewfinder 5. At this time, the VTR is held in the stop mode, the pause mode, the standby mode or the like, thus stopping the video recording operation. After the framing has been effected, the output selector switch $SW_4$ is moved to the position B to connect the bypass circuit 11 and then the picture combining switch $SW_2$ is moved to the negative position NEGA. Also, the color selector switch $SW_3$ is operated to select a red color signal output. When this occurs, the title characters of the character plate being shot by the television camera are picked up as a red-character title at the framed position in the electronic viewfinder 5. In this case, the red character portion is an image due to the picture signal produced by the combining means 21. In the case of a character plate comprising white characters on a black background, the picture combining switch $SW_2$ is moved to the positive position POSI. The red characters of the title appearing in the electronic viewfinder 5 are provided by the binary signal output applied from the memory means 19 through the bypass circuit 11 so that in this monitor mode the variable resistor $R_1$ is adjusted so as to adjust the threshold point of the comparison means 18. After the framing of the title characters in the electronic viewfinder 5 and the adjustment of the threshold level have been effected, the binary signal output indicative of the title characters is stored in the memory circuit 9. In other words, the write switch $SW_1$ is operated so that the binarized luminance signal for one field at this moment is written in the memory circuit 9. This corresponds to the still photographing of a title character still picture at the field period or a shutter speed of 1/60 second. Then, the output selector switch $SW_4$ is moved to its position M and the VTR is brought into a video recording operation. In this condition, when a desired background is shot by the television camera so that the stored contents of the memory circuit 9 are read twice per frame, the title comprising the red characters is inserted in the background or the title background and the combined signal of the television picture signal and the still picture signal is recorded in the VTR while monitoring it by the color electronic viewfinder 5. To stop the insertion of the title characters, it is only necessary to move the picture combining switch $SW_2$ to the off position OFF and thereafter only the television picture signal is recorded in the VTR.

(b) The production of an image of an object within a window having a shape confirming to the contour of title characters on a background which is all in red color.

In this case, the shooting of title characters by means of a character plate and the required framing are performed in the like manner as the previously mentioned (a) so that with the output selector switch $SW_4$ moved to its position B, the picture combining switch $SW_2$ is moved to the positive position POSI and a red color signal is selected by the color selector switch $SW_3$. Of course, the picture combining switch $SW_2$ is moved to the negative position NEGA in the case of a character plate comprising white characters on a black background. As a result, the title characters of the title plate being shot by the television camera appear as black characters on a red background at the framed position in the color electronic viewfinder 5. In this case, the red background portion is an image due to the picture signal generated by the combining means 21. After the framing of the picture signal and the adjustment of the threshold level as well as the writing of the binary signal into the memory circuit 9 have been effected in the like manner as the previously mentioned (a), the output selector switch $SW_4$ is moved to the position M and the VTR is brought into a recording operation. Then, a desired object is shot by the television camera so that a title character window is formed on the red title background and the image of the object appears within the contour of the title characters. Thus, the resulting combined signal of the still picture signal and the television picture signal is recorded in the VTR while monitoring the same through the color electronic viewfinder 5. Of course, the insertion of the title characters can be stopped by simply moving the picture combining switch $SW_2$ to the position OFF and thereafter only the television picture signal is recorded in the VTR. Note that when the write switch $SW_1$ is operated again, the previously stored content of the memory circuit 9 is erased and the writing of a new storage content is effected.

In each of the cases of the above-mentioned (a) and (b), if it is desired to insert a title in the course of the shooting, it is only necessary that after preliminarily shooting title characters and writing the resulting binary signal in the memory circuit 9, the shooting is started with the picture combining switch $SW_2$ moved to the position OFF and then, with the output selector switch $SW_4$ moved to the position M, the picture combining switch $SW_2$ is moved to the positive position POSI or the negative position NEGA at a desired moment for title insertion.

In accordance with the embodiment of FIG. 1, it is possible to produce a special effect of presenting the light or dark portion of an object image all in one particular color in addition to the above-mentioned (a) and (b). More specifically, in this case the television camera is first brought into the operating mode and the VTR is held in the standby mode or the like to prevent its recording operation. The output selector switch $SW_4$ is moved to the position B (the bypass circuit 11 side) and the picture combining switch $SW_2$ is moved to the positive position POSI or the negative position NEGA. Also the color selector switch $SW_3$ is operated to select a color signal output of a desired hue used for colorizing purposes. In accordance with the connected positon POSI or NEGA of the picture combining switch $SW_2$, the image of an object being shot currently by the image pickup means 1 appears in the color electronic viewfinder 5 as an image in which the light or dark poriton is all in the selected hue. It is needless to say that the threshold point of the light portion or the dark portion is adjustable by means of the variable resistor $R_1$ while looking at the color electronic viewfinder 5. After the preparations have been made in this way, in the like manner as in the previously mentioned cases the VTR is brought into a recording operation and the television camera starts shooting. As a result, in accordance with the threshold level of a certain brightness (or darkness) in the image of an object shot by the television camera, a portion of the resulting picture signal is presented all in the desired hue and this picture signal is recorded in the VTR while monitoring it through the electronic viewfinder 5. In this case, the color selector switch $SW_3$ may be sequentially operated to change its position and thereby provide a special effect in which the hue of the portion is changed sequentially. Of course, such special effect is eliminated by moving the picture combining switch $SW_2$ to the off position.

FIG. 2 is a block diagram showing the principal part of another embodiment of the invention, in which the elements equivalent to those of FIG. 1 are designated by the same reference numerals. The embodiment of FIG. 2 is identical in construction with the embodiment of FIG. 1 except that the combining means 21 is replaced with modified combining means 21a.

More specifically, the combining means 21a includes a positive/negative selector switch $SW_{2a}$, a picture combination actuation switch $SW_{2b}$ and picture luminance adjusting means 14 in addition to the first and second inverters $INV_1$ and $INV_2$, and the switches $SW_{2a}$ and $SW_{2b}$ correspond to one in which the functions of the picture combining switch $SW_2$ in the embodiment of FIG. 1 are divided into two. The picture luminance adjusting means 14 includes an amplifier 15 for generating a luminance signal for a picture signal to be inserted and a luminance level setting variable resistor $R_{21}$.

In accordance with the embodiment of FIG. 2, although it is possible to generate only achromatic monochrome signals as picture signals to be inserted, the luminance of such picture signal can be adjusted by adjusting the dc output voltage of the amplifier 15 through the variable resistor $R_{21}$. Moreover, the division of the picture combining switch into the switches $SW_{2a}$ and $SW_{2b}$ has the effect that whether the polarity inversion of the binary signal from the memory means 19 should be made and whether the combination of picture signals should be made can be respectively determined by the positive/negative selector switch $SW_{2a}$ and the picture combination actuating switch $SW_{2b}$ independently of each other. Also, in the case of this embodiment the electronic viewfinder 5 need not be a color viewfinder and it may be a monochrome one.

FIG. 3 is a block diagram showing the principal part of yet another embodiment of the invention which is identical with the embodiment of FIG. 1 except that the combining means 21 is replaced with another modified combining means 21b including the color signal generating circuit 10 and the color selector switch SW₃ of the embodiment of FIG. 1, the positive/negative selector switch SW$_{2a}$ and the picture combination actuating switch SW$_{2b}$ of the embodiment of FIG. 2, the first inverter INV₁ and superimposing means 16 replacing the switching means 12 and 13.

In the embodiment of FIG. 3, the combining means 21b includes variable resistors R₃₁ and R₃₂ and a field-effect transistor FET₃ forming the superimposing means 16 so that the signal after the superimposition or the combined signal is applied to the output amplifier 4 via a white clip circuit 17 to limit the white peak of the signal to less than a predetermined value. The variable resistor R₃₁ is provided to adjust the intensity (the picture density) of a television picture signal on which a signal is superimposed and the other variable resistor R₃₂ is provided to adjust the intensity of a picture signal according to a binary signal to be superimposed. For instance, the variable resistor R₃₂ may be varied continuously so as to fade in or fade out a picture to be inserted. Thus, in the embodiment of FIG. 3, instead of using switching means for cutting off a portion of a television picture signal and inserting an insert picture signal therein, the insert picture signal is superimposed on the television picture signal without interrupting the television picture signal whereby a special effect of inserting a still picture such as title characters or causing the light or dark portion of a picture to appear all in a particular color in accordance with a predetermined threshold point is provided to any desired extent or in the form of continuous variations through the adjustment of the variable resistors R₃₁ and R₃₂.

While, in the embodiments described above, the picture combining apparatus of this invention is constructed by incorporating its circuit means in a television camera, in the case of a television camera of the type including a separate camera control unit (CCU), the apparatus may be incorporated in the CCU or alternatively the apparatus may be incorporated in a VTR. While it is needless to say that the use of a television camera equipped with a color electronic viewfinder as shown in the illustrated embodiments is convenient owing to the easiness of monitoring the manner in which pictures are combined, even the use of a monochrome electronic viewfinder presents no great difficulty in the combination of pictures, e.g., the insertion of title characters. While, in this case, it is not easy to monitor the above-mentioned special effect of causing a portion of a picture (a portion of luminance higher or lower than a given luminance) to appear all in a particular color, this special effect can be monitored by connecting a small color monitoring receiver to the monitor terminal of the VTR and the portability will not be impaired considerably owing to the small size of the receiver.

Further, while, in this invention, the memory means 19 stores the binarized luminance signal for each field, this corresponds to a shutter speed of 1/60 second and therefore there is usually no danger of hand shaking.

What is claimed is:

1. A television camera comprising:
   (a) image pickup means for dividing an image of an object into a given number of picture elements, converting each of said given number of picture element photoelectrically and generating a first picture signal indicative of a first object image;
   (b) means for extracting from said first picture signal a luminance signal indicative of the luminance of each said given number of picture elements of said object image;
   (c) means for comparing the level of said luminance signal with a predetermined threshold level, said comparing means being responsive to a difference in amplitude between the level of said luminance signal and said threshold level to convert said luminance signal to a binary signal representing one of two different levels;
   (d) memory means for storing the binary signals generated from said comparing means;
   (e) signal generating means for generating a second picture signal on the basis of said binary signals stored in said memory means; and
   (f) means for combining said second picture signal generated by said signal generating means with a third picture signal indicative of a second object image generated by said image pickup means to form a composite image in which a part of said first object image is superimposed on said second object image.

2. A television camera according to claim 1, wherein said combining means includes switching means selectively responsive to said two different levels of said signal read out by said readout means to combine said second and third picture signals from said image pickup means and said signal generating means respectively.

3. A television camera according to claim 1, wherein said combining means includes first switch means for delivering said second picture signal from said signal generating means when said signal read out by said readout means is at one of said two different levels, and second switch means for delivering said third picture signal from said image pickup means when said signal read out by said readout means is at the other of said two different levels.

4. A television camera according to claim 1, wherein said combining means includes means for superimposing said second picture signal from said signal generating means on said first picture signal from said image pickup means when said signal read out by said readout means is at one of said two different levels.

5. A television camera according to claim 1, wherein said comparing means includes means for adjusting said threshold level.

6. A television camera according to claim 1, wherein said signal generating means includes means for selectively generating a plurality of color signals each thereof indicative of one of a plurality of different hues.

7. A television camera according to claim 1, wherein said memory means stores the output signal from said comparing means for each field.

8. A television camera according to claim 1, further comprising an electronic viewfinder for reproducing said combined picture signal by said combining means.

9. A television camera according to claim 1, further comprising means for causing said binary signal to by-pass said memory means and pass directly to said signal generating means.

10. An apparatus for processing a first picture signal indicative of a primary object image and a second picture signal indicative of a secondary object image, each of said images being divided into a given number of picture elements, said apparatus comprising:

(a) means responsive to said second picture signal to generate a luminance signal indicative of the luminance of said given number of picture elements of said secondary object image;

(b) means for compring the level of said luminance signal with a predetermined threshold level, said comparing means being responsive to a difference in magnitude between the level of said luminance signal and said threshold level to generate a binary signal having one of two different levels;

(c) means for storing the binary signal generated from said comparing means;

(d) means responsive to said binary signal stored in said memory means to generate a third picture signal; and (e) means for combining said first and third picture signals to form a composite image in which a part of said secondary object image is superimposed on said primary object image.

* * * * *